US011546408B2

(12) United States Patent
Calder

(10) Patent No.: US 11,546,408 B2
(45) Date of Patent: Jan. 3, 2023

(54) CLIENT-SIDE MEASUREMENT OF COMPUTER NETWORK CONDITIONS

(71) Applicant: Microsoft Technology Licensing, LLC, Redmond, WA (US)

(72) Inventor: Matthew James Calder, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/087,456

(22) Filed: Nov. 2, 2020

(65) Prior Publication Data

US 2022/0141279 A1    May 5, 2022

(51) Int. Cl.
| | |
|---|---|
| *H04L 67/025* | (2022.01) |
| *H04L 43/106* | (2022.01) |
| *H04L 61/4511* | (2022.01) |
| *H04L 67/1014* | (2022.01) |
| *H04L 67/101* | (2022.01) |

(52) U.S. Cl.
CPC ......... *H04L 67/025* (2013.01); *H04L 43/106* (2013.01); *H04L 61/4511* (2022.05); *H04L 67/101* (2013.01); *H04L 67/1014* (2013.01)

(58) Field of Classification Search
CPC . H04L 67/025; H04L 43/106; H04L 61/4511; H04L 67/101
See application file for complete search history.

(56) References Cited

U.S. PATENT DOCUMENTS

| | | | |
|---|---|---|---|
| 10,567,246 B2 | 2/2020 | Randolph et al. | |
| 2003/0217147 A1* | 11/2003 | Maynard | H04L 67/101 |
| | | | 709/225 |
| 2009/0164614 A1* | 6/2009 | Christian | H04L 45/745 |
| | | | 709/223 |
| 2014/0250230 A1* | 9/2014 | Brueck | H04L 67/18 |
| | | | 709/226 |
| 2018/0027088 A1 | 1/2018 | Zou et al. | |
| 2020/0126187 A1* | 4/2020 | Park | G06T 3/4046 |

(Continued)

OTHER PUBLICATIONS

Burnett, et al., "Network Error Logging: Client-side measurement of end-to-end web service reliability", In the Proceedings of the 17th USENIX Symposium on Networked Systems Design and Implementation, Feb. 25, 2020, pp. 985-998.

(Continued)

*Primary Examiner* — Abdulkader M Alriyashi
(74) *Attorney, Agent, or Firm* — Han Gim; Newport IP, LLC

(57) ABSTRACT

Techniques of client-side measurement of computer network conditions without application control are disclosed herein. One example technique includes instructing a web browser on a client device to submit status report to a server of a computer system currently not providing content to the client device. The example technique can then include identifying multiple packets containing the status report from the web browser received at the server corresponding, determining a condition of the computer network between the server and the client device based on transmission/reception measurements of the received multiple packets at the server, and selectively directing the server of the computer system to provide the content requested by the web server based on the determined condition of the computer network.

17 Claims, 6 Drawing Sheets

(56) References Cited

U.S. PATENT DOCUMENTS

2020/0267069 A1\* 8/2020 Li .................. H04L 43/0841
2020/0272920 A1\* 8/2020 Liu .................. G06N 20/00

OTHER PUBLICATIONS

Calder, Matt, "Client-side Active Measurements Without Application Control", In Journal of Computing Research Repository, Jul. 24, 2020, 8 Pages.

Calder, et al., "Odin: Microsoft's Scalable Fault-Tolerant CDN Measurement System", In Proceedings of the 15th (USENIX) Symposium on Networked Systems Design and Implementation, Apr. 9, 2018, 17 Pages.

Creager, Douglas, "Intent to Migrate: Reporting and Network Error Logging", Retrieved from: https://discourse.wicg.io/t/intent-to-migrate-reporting-and-network-error-logging/2864, Jun. 28, 2018, 3 Pages.

Leeman, Freddie, "Why you need 'Network Error Logging' (NEL)", Retrieved from: https://www.uriports.com/blog/network-error-logging/, Jan. 4, 2020, 9 Pages.

Singh, et al., "Characterizing the Deployment and Performance of Multi-CDNs", In Proceedings of the Internet Measurement Conference, Oct. 31, 2018, pp. 168-174.

\* cited by examiner

CLIENT-SIDE MEASUREMENT OF COMPUTER NETWORK CONDITIONS

BACKGROUND

A web application or web app is a piece of software executed on a web server in order to provide a web or "cloud" service. Users can access cloud services provided by such web applications using a client device via a computer network such as the Internet. For example, a web server in a remote datacenter can execute a web application to provide a web-based email client for managing user emails. A user can access the web-based email client using a web browser on a client device instead of using a standalone email application executed on the client device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

High latency, service interruptions, and other types of poor performance can negatively impact user experience of web services. Certain techniques have been designed to provide fast and reliable web services. For instance, content providers often deploy content delivery networks (CDNs) for delivering content to end users. A CDN can include multiple geographically distributed servers linked by a computer network and storing copies of content. During operation, a CDN can direct one of the multiple servers (often referred to as point-of-presence or "PoP") most suitable, for instance, being geographically closest to an end user, to provide requested content. When one PoP fails, the CDN can switch content delivery to another server in the CDN. Thus, by effectively managing content delivery using the multiple geographically distributed servers, the CDN can deliver requested content to end users in a fast and reliable fashion.

As network conditions change, the most suitable PoP can also change. To effectively managing content delivery, content providers and CDNs continuously monitor health and conditions of computer networks used for content delivery. For example, CDNs can perform certain network measurements to track conditions of computer networks that connect servers in the CDNs to client devices. Such network measurements can then be used for traffic engineering or mitigating network congestion, outages, or other technical issues. For instance, when a network congestion between an existing PoP and a client device is detected, a CDN can redirect the client device to a new PoP in the CDN for receiving content. An example technique for such a redirection can include modifying a value of an IP address in a DNS record from the existing PoP to the new PoP. The IP address corresponds to a domain name for retrieving content. As such, the client device can be redirected to the new PoP to receive uninterrupted content delivery despite the network congestion between the existing PoP and the client device.

Network measurements can be performed from different vantage points. For example, CDNs can perform server-side measurements to determine network conditions experienced by a server in a CDN via, for instance, active layer-three measurements such as traceroute and ping. Network measurements can also be performed to determine network conditions experienced by a client device (referred to as client-side measurements). Both server-side and client-side network measurements would be useful for having an overview of the network conditions between a PoP of a CDN and a client device in a computer network. However, in order to obtain client-side measurements, a content provider may need application control over an application embedding delivered content at the client side. For instance, a user can use a Facebook application on a smartphone to retrieve content from a CDN deployed by Facebook.com. In this scenario, the Facebook application can include executable codes execution of which cause the client device to perform and transmit client-side measurements to the CDN deployed by Facebook.com.

Such application control, however, may not be always be available to a content provider or CDN. For example, instead of using the Facebook application, the user can use a web browser to view content from Facebook.com. The web browser may not include the executable codes configured to cause the client device to perform and transmit the client-side measurements. In other examples, certain content providers (e.g., Akamai) and CDNs may not even provide a corresponding application. One technique to allow performance of client-side measurements under such a scenario is to inject executable codes, such as JavaScript codes, to the delivered content. However, the injected executable codes may be inoperable under certain scenarios. For example, a web browser can include an extension (e.g., ad-blocking extension) that prevents the injected JavaScript codes from being executed during runtime. Even when operable, the injected executable codes can raise performance, security, and privacy concerns. Thus, a lack of application control may negatively impact a content provider's ability to provide fast and reliable cloud services to end users.

Several embodiments of the disclosed technology can address aspects of the foregoing difficulties by implementing client-side measurement of network conditions without application control or injection of executable codes. Instead, embodiments of the disclosed technology can leverage a background process for status reporting in a web browser executed on a client device to direct the web browser to transmit packets of status reports to one or more additional servers in a computer system, such as a CDN. Upon receiving the transmitted packets from the web browser executing on the client device, the CDN can be configured to infer values of various client-side measurements from the received packets by, for example, instrumenting TCP connections. For example, the CDN can infer a round trip time between the client device and a server, a time to first byte, a throughput, a loss of packets or retransmission, and a jitter of the packets as represented by packet inter-arrival time. In the following description, Network Error Logging (NEL) according to the W3 Specification for reporting client-side network error and status was used as an example status reporting technique. In other embodiments, additional status reporting or other suitable types of protocols for web browsers and/or client devices may also be used.

NEL is a W3 Specification for reporting client-side networking errors and performance status in web applications. NEL can provide low-layer networking errors for failed requests that are not exposed to other JavaScript APIs. For example, NEL can report DNS unreachable when a DNS server cannot be reached. NEL can also report a TCP timeout when a TCP connection to a server timed out. NEL enables a site owner (e.g., a CDN owner) to configure a measurement policy for a domain under control by setting the NEL and Report-To headers in a HTTP response, as follows:

NEL: {"report_to": "default", "max_age": 86400, "success_fraction": 0.25, "failure_fraction": 1.0}

Report-To: {"group": "default", "max_age": 86400, "endpoints": [{"url": "https://neltest.com/report"}]}

In the above header examples, the NEL header specifies a policy to sample 25% of successful requests and 100% of failed requests for up to 24 hours (i.e., 86400 seconds). When enabled, the NEL policy applies to all resources from the same domain, and optionally sub-domain, for the "max_age" duration. In the above example, the Report-To header includes endpoints field is a list of report endpoints where the web browser uploads status reports in a background process outside of a rendering path of the web browser.

In accordance with embodiments of the disclosed technology, a CDN (or other suitable types of a computer system) can implement a delivery controller that is configured to direct a web browser requesting content from the CDN to transmit status reports to various servers or endpoints in the CDN. For example, the delivery controller can be configured to specify a list of endpoints to which the web browser is to transmit status reports and a sampling fraction for failed and successful requests, such as those shown in the NEL header example above. In certain embodiments, the delivery controller can modify the list of endpoints on a periodic basis. For instance, the "endpoints" field above can be changed from "https://neltest.com/report" to "https://neltest2.com/report" after ten seconds. Subsequently, the "endpoints" field can be further changed from "https://neltest2.com/report" to "https://neltest3.com/report" after another ten seconds. As such, the delivery controller can direct the web browser to submit status reports to various endpoints in the CDN on a sequential, round robin, or other manners.

In operation, in certain embodiments, upon receiving a user request for content, a web browser can be configured to initiate a background process to transmit a content request, such as in the form of a HTTP request to a network address corresponding to a content source, such as a CDN. Upon receiving the content request, the delivery controller at the CDN can be configured to select a PoP (e.g., a first server) for providing content to the client device and provide values of the NEL and Report-To fields to specify that the web browser should transmit status reports to another PoP (e.g., a second server) at certain intervals. Upon receiving the HTTP response, the web browser at the client device can be configured to execute a background process for error reporting according to the values in the NEL and Report-To fields and transmit status reports to the second server via the computer network. In other embodiments, the delivery controller can be configured to perform the foregoing operations in response to receive a request to instantiate a virtual machine, a container, a request for new emails, or any other suitable types of request.

Upon receiving packets of the transmitted status reports from the client device, the delivery controller can be configured to perform server-side measurements and infer client-side network conditions based on the received packets. For instance, upon reception of a packet representing a connection request (e.g., SYN-SENT) from the client device, the second server can transmit a packet of acknowledgement (e.g., SYN-RECEIVED) and record a first time. Upon receiving the packet of acknowledgement, the client device can transmit another packet indicating connection establishment (e.g., ESTABLISHED). The second server can then record a second time when receiving the packet indicating connection establishment and determine a round trip time by subtracting the first time from the second time. The delivery controller can also be configured to infer a round trip time and other suitable network conditions.

In certain implementations, the delivery controller can also be configured to identify an association of the client device with a local DNS server (LDNS) by forcing the LDNS to recursively resolve a domain name for the second server. For example, the delivery controller can be configured to assign a new domain name for the second server, such as "https://neltest2.com/report." The delivery controller can also be configured to create a new resource record in an authoritative DNS server in the CDN to identify that the new domain name corresponds to an IP address of the second server.

When the web browser on the client device attempts to transmit status report to the new domain name, the LDNS is unlikely to have a cached IP address that corresponds to this domain name because the domain name is newly created. As such, the LDNS attempts to resolve this domain name by consulting the authoritative DNS server in the CDN. Upon identifying the LDNS that requested the resolution of the new domain name, the delivery controller can generate a mapping between the client device and the LDNS. Using such a mapping, the delivery controller can be configured to effectively manage content delivery using various points of presence in the CDN.

Several embodiments of the disclosed technology can thus enable a CDN, a cloud service provider, or a content provider to initiate client-side measurements to corresponding service infrastructure without client-side application control. For example, by directing the web browser to submit status reports to the second server from the first server, the delivery controller can infer that a network issue exists between the second server and the client device when the second server does not receive or receive incomplete status report from the client device. On the other hand, the delivery controller can also infer a good network condition between the second server and the client device when an inferred round trip time or time to first byte of the received packets exceed a corresponding threshold. Thus, when a network condition between the first server and the client device is detected, the delivery controller may switch content delivery from the first server to the second server to achieve low latency and high availability.

DETAILED DESCRIPTION

Figure 1:
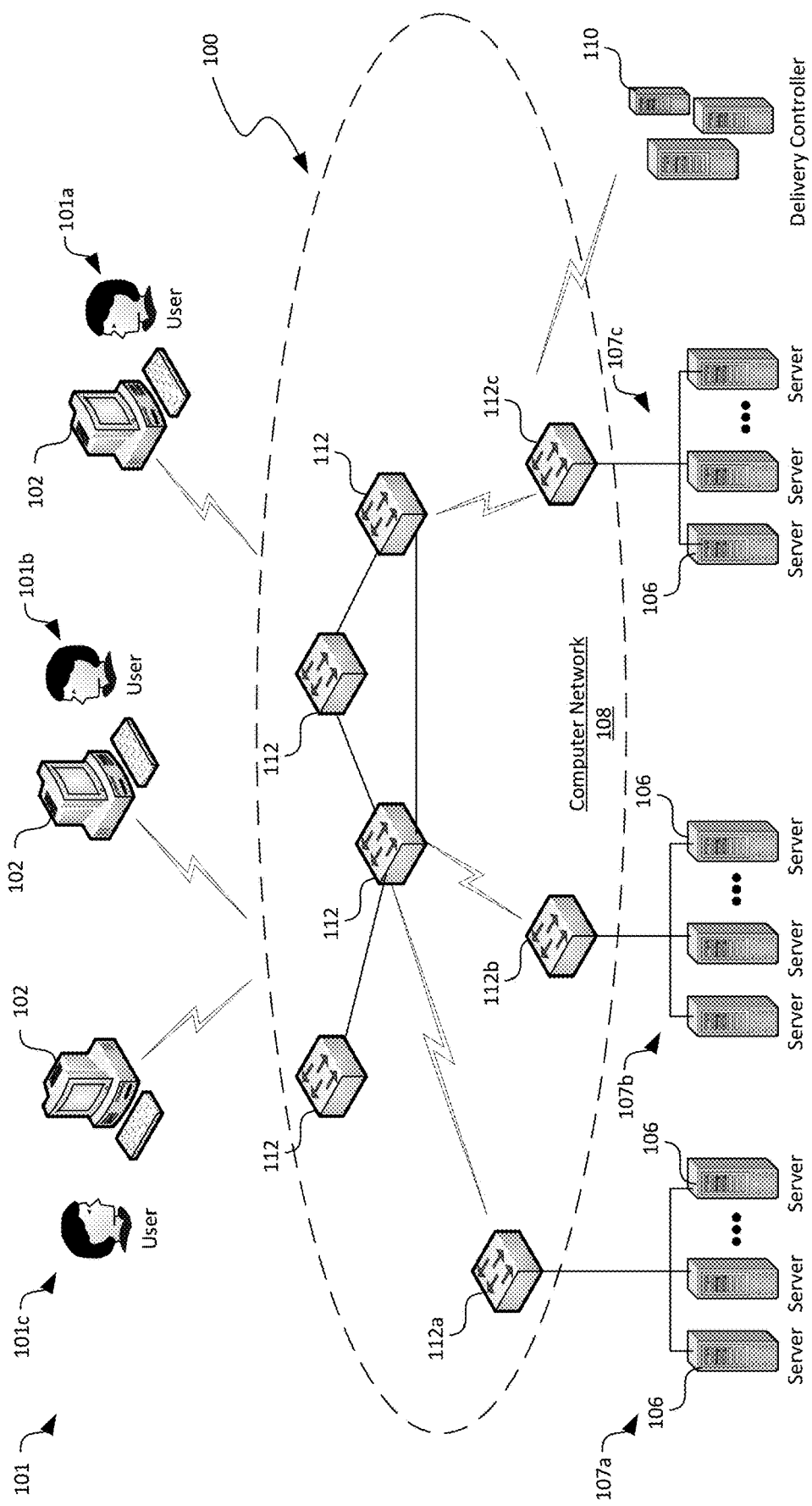
FIG. 1 is a schematic diagram illustrating a computing system implementing client-side measurement of computer network conditions in accordance with embodiments of the disclosed technology.

Certain embodiments of systems, devices, components, modules, routines, data structures, and processes for implementing client-side measurement of computer network conditions in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

Many terminologies are used herein to illustrate various aspects of the disclosed technology. Such terminologies are intended as examples and not definitions. For instance, a computing system can be a computing facility having a computer network interconnecting a plurality of host machines or hosts to one another or to external networks (e.g., the Internet). An example of such a computing facility can include a datacenter for providing cloud computing services. A compute network can include a plurality of network devices. A network device can be a physical network device, examples of which include routers, switches, hubs, bridges, load balancers, security gateways, or firewalls. A host or host device can include a computing device that is configured to implement, for instance, one or more virtual machines, containers, or other suitable virtualized components. For example, a host can include a remote server having a hypervisor configured to support one or more virtual machines, containers, or other suitable types of virtual components. In another instance, a host can also include a desktop computer, a laptop computer, a smartphone, a web-enabled appliance (e.g., a camera), or other suitable computing devices configured to implement one or more containers or other suitable types of virtual components.

In another example, a computing service or cloud service can include one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally includes delivery of operating systems and associated services over the computer network without requiring downloads or installation. IaaS generally includes outsourcing equipment used to support storage, hardware, servers, network devices, or other components, all of which are made accessible over a computer network.

To effectively managing delivery of cloud services, content providers and other types of cloud service providers continuously monitor health and conditions of computer networks used for content and/or cloud service delivery. Typically, server-side measurements can be performed readily because a cloud service provider is in control of the server. However, client-side measurements typically require application control or injection of executable codes at the client side. Such application control may not be always available while the injection of executable codes can raise various performance, security, and privacy concerns.

Several embodiments of the disclosed technology can address aspects of the foregoing difficulties by implementing client-side measurement of network conditions without application control or injection of executable codes. In certain implementations, a server providing content or other cloud service to a client device can direct a web browser and/or client device to transmit error or status reports to one or more additional servers in a computer system, such as a CDN. The CDN can then detect the packets of status reports received at the one or more additional servers and infer client-side measurements based on transmission/reception measurements of the received packets at the additional servers. As such, a CDN, a cloud service provider or a content provider can initiate client-side measurements to corresponding service infrastructure without client-side application control or injection of executable codes at client side, as described in more detail below with reference to FIGS. 1-5.

FIG. 1 is a schematic diagram illustrating a computing system 100 implementing client-side measurement of computer network conditions in accordance with embodiments of the disclosed technology. As shown in FIG. 1, the computing system 100 can include a computer network 108 interconnecting a plurality of servers 106, a plurality of client devices 102 of users 101, and a delivery controller 110 to one another. In certain embodiments, the computing system 100 can be a content delivery network configured to provide requested content to the users 101 via the computer network 108. In other embodiments, the computing system 100 can be a cloud computing system having one or more datacenters and configured to deliver suitable cloud services to the users 101. In further embodiments, the computing system 100 can be a private cloud system, an enterprise computing system, or other suitable types of computing system. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the computer network 108 can include multiple network devices 112 that interconnect the multiple servers 106 and the client devices 102. In certain embodiments, the servers 106 can be geographically distributed in different physical locations. For example, in the illustrated embodiment, the servers 106 are grouped into three clusters identified individually as first, second, and third clusters 107a-107c. At least one of the first, second, or third clusters 107a-107c (referred to as clusters 107) can be located in a different geographical location than the other clusters 107. In other examples, individual servers 106 in each cluster 107 can be geographically distributed. In other embodiments, the servers 106 can be organized into racks, action zones, groups, sets, or other suitable divisions.

In the illustrated embodiment, each of the clusters 107a-107c is operatively coupled to a corresponding network device 112a-112c, respectively. The network devices 112a-112c can then be operatively coupled to additional network devices 112 to form a network in a hierarchical, flat, mesh, or other suitable types of topology. The computer network 108 can allow communications among the servers 106 and the client devices 102. In other embodiments, the multiple clusters 107a-107c can share a single network device 112 or can have other suitable arrangements. Though only the network devices 112 are shown in FIG. 1 for illustration purposes, in certain implementations, the computer network 108 can include load balancers, DNS servers, firewalls, and/or other suitable devices in addition to or in lieu of those shown in FIG. 1.

The servers 106 can individually be configured to provide content delivery, computing, storage, and/or other suitable cloud services to the individual users 101. For example, each of the servers 106 can be configured to store copies of the same or different content (e.g., images, videos, documents, etc.) and to provide the content to the client devices 102 via the computer network 108 upon request. In other examples, each of the servers 106 can also initiate and maintain one or more virtual machines (not shown) upon requests from the users 101. The users 101 can then utilize the instantiated virtual machines 144 to execute suitable processes for performing computation, communication, and/or other suitable tasks. In certain embodiments, one of the servers 106 can provide cloud services for multiple users 101. In other embodiments, multiple servers 106 can provide cloud service for one or more users 101a-101c.

The client devices 102 can each include a computing device that facilitates corresponding users 101 to access various computing services provided by the servers 106 via the computer network 108. For example, in the illustrated embodiment, the client devices 102 individually include a desktop computer configured to execute suitable instructions to provide a web browser (not shown). In other embodiments, the client devices 102 can also include laptop computers, tablet computers, smartphones, or other suitable computing devices. Even though three users 101 are shown in FIG. 1 for illustration purposes, in other embodiments, the computing system 100 can facilitate any suitable numbers of users 101 to access content, cloud, and/or other suitable types of computing services provided by the servers 106 and/or other components in the computing system 100.

FIGS. 2A-2D are schematic block diagrams of the computing system 100 having a delivery controller 110 for facilitating client-side measurement of computer network conditions in accordance with embodiments of the present technology. In FIGS. 2A-2D and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

Figure 2A:
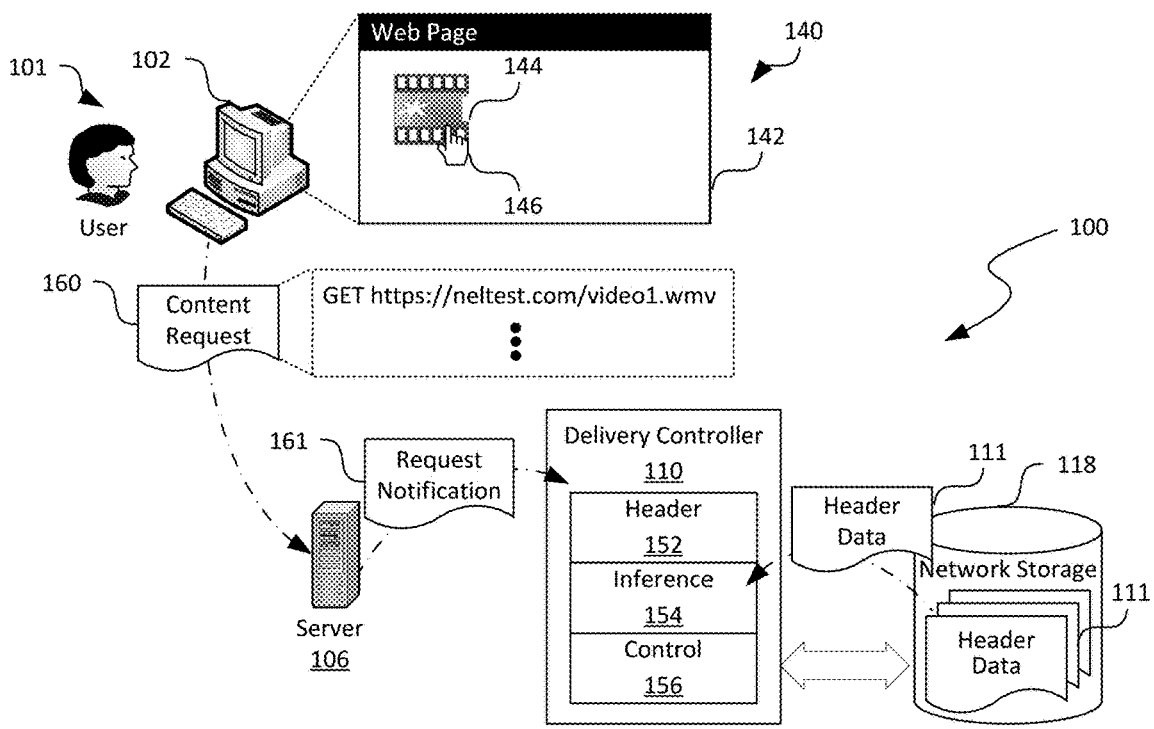
FIGS. 2A-2D are schematic block diagrams illustrating certain operations of client-side measurement of computer network conditions in the computing system of FIG. 1 in accordance with embodiments of the present technology.

As shown in FIG. 2A, the delivery controller 110 can include a header module 152, an inference module 154, and a control module 156 operatively coupled to one another. The delivery controller 110 can also be operatively coupled to a network storage 118 containing records of header data 111 for directing a web browser on a client device 102 for submitting status reports. The header data 111 can include data defining a trigger of reporting, a duration of reporting, a percentage of success requests to be reported, a percentage of failed request to be reported, a list of network destinations or endpoints for submitting status reports, and/or other suitable parameters of status reporting. Though particular modules of the delivery controller 110 are shown in FIG. 2A, in other embodiments, the delivery controller 110 can include interface, network, database, or other suitable types of modules.

As shown in FIG. 2A, the client device 102 can be configured to execute suitable instructions to provide a web browser 140 surfacing a web page 142. Upon receiving a user input 146 from the user 101 for content, for instance, a video clip 144, the web browser 140 can be configured to generate and transmit a content request 160 to the computing system 100. In the illustrated example, the content request 160 is shown as formatted as a HTTP request having a command "GET https://neltest.com/video1.wmv." In other embodiments, the content request 160 can be formatted according to other suitable protocols.

Figure 2B:
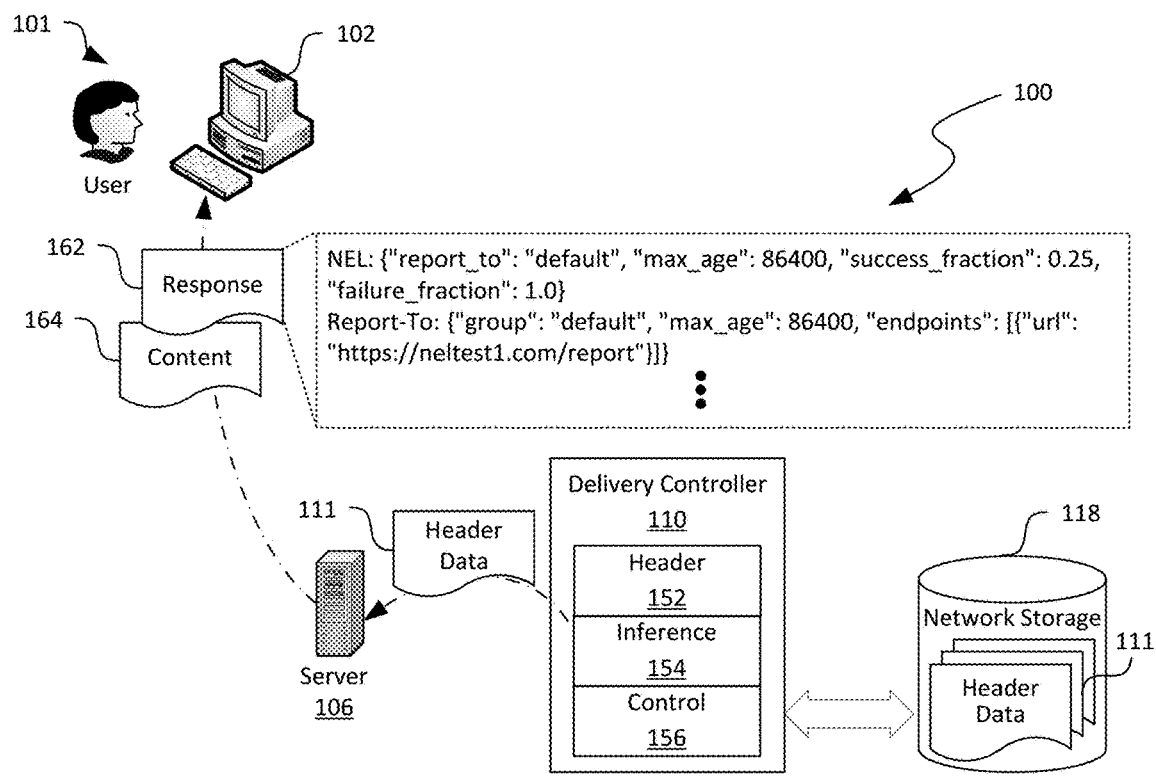

Upon receiving the content request 160 at a server 106 in the computing system 100, the server 106 can be configured to transmit a request notification 161 to the delivery controller 110. Based on the request notification 161, the header module 152 can be configured to generate suitable header values for directing the web browser 140 to submit suitable status reports. For example, as shown in FIG. 2B, the header module 152 can be configured to insert the following into corresponding NEL header fields of a response 162 to the received content request 160:

NEL: {"report_to": "default", "max_age": 86400, "success_fraction": 0.25, "failure_fraction": 1.0}
Report-To: {"group": "default", "max_age": 86400, "endpoints": [{"url": "https://neltest.com/report"}]}

In the above examples, the NEL header specifies a policy to sample 25% of successful requests and 100% of failed requests for up to 24 hours (i.e., 86400 seconds). When enabled, the NEL policy applies to all resources from the same domain, and optionally sub-domain, for the "max_age" duration. In the above example, the Report-To header includes endpoints field is a list of report endpoints where the web browser 140 uploads status reports as one or more packets in a background process outside of a rendering path of the web browser 140. Also shown in FIG. 2B, the delivery controller 110 can also instruct the server 106 to provide the requested content 164 to the client device 102.

Figure 2C:
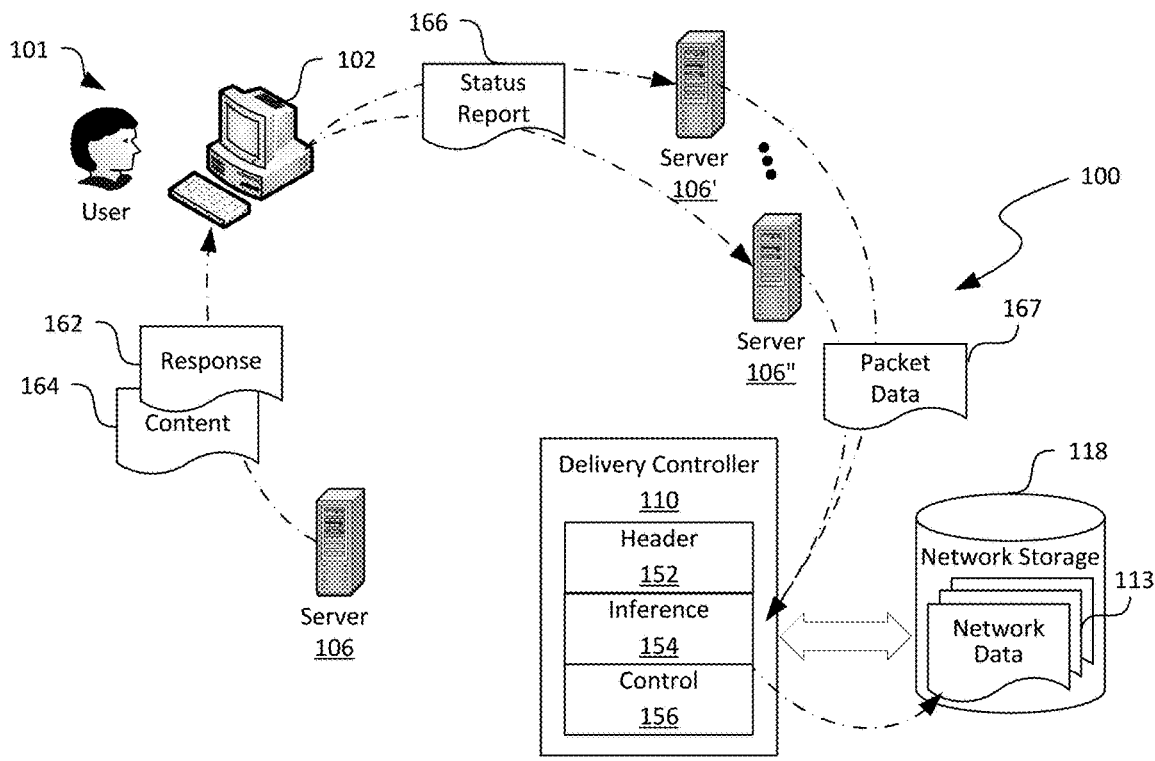

As shown in FIG. 2C, upon receiving the response 162, the web browser 140 (FIG. 2A) can be configured to initiate a background process to periodically submit status reports 166 to a network location, such as "https://neltest.com/report" in the above example. In one example, the network location specified in the NEL header field in the response 162 can correspond to another server 106' different than the server 106 providing content to the client device 102. In other examples, the NEL header field can be configured to include a list of endpoints such that the web browser 140 submits status reports to the another server 106' for a first period and then to yet another server 106" during a second period. In further examples, the NEL header field can be configured to direct the web browser 140 to submit status reports 166 to the server 106 in addition to or in lieu of the other servers 106' and 106".

Upon receiving the status reports 166, the servers 106' and 106" can be configured to transmit packet data 167 of the received status report 166 to the delivery controller 110. The packet data 167 can include data or metadata included in various data fields of the received packets of the status report 166. For example, the packet data 167 can include values of a source port, a destination port, a sequence number, a flag field, a source address, a destination address, a data field, or other suitable types of field. The packet data 167 can also include values of a data field containing information such as a packet type, a percentage of successful requests, a percentage of failed requests, or other suitable information.

Based on the received packet data 167, the inference module 154 can be configured to infer client-side measurements of the computer network 108 (FIG. 1) from the vantage point of the client device 102. For instance, by identifying a time of establishing a TCP connection with the client device 102 and a time of receiving data via the established connection from the client device 102, the inference module 154 can be configured to identify a time to first byte for the packets. The inference module 154 can also be configured to infer a round trip time between the server 106' or 106" and the client device 102. For instance, upon reception of a packet representing a connection request (e.g., SYN-SENT) from the client device, the second server can transmit a packet of acknowledgement (e.g., SYN-RECEIVED) and record a first time. Upon receiving the packet of acknowledgement, the client device can transmit another packet indicating connection establishment (e.g., ESTABLISHED). The second server can then record a second time when receiving the packet indicating connection establishment and determine a round trip time by subtracting the first time from the second time. In another example, the inference module 154 can be configured to infer a throughput of the client device via the computer network 108 by monitoring a total number of bytes received from the client device 102 and a period during which the total number of bytes are received. In yet another example, the inference module 154 can be configured to infer a loss of packets by monitoring for duplicate packets received from the client device 102 during a preset period of time. In a further example, the inference module 154 can be configured to infer a jitter experienced by the client device 102 by monitoring values of intervals between reception of successive packets from the client device 102. In yet other examples, the inference module 154 can also be configured to infer or identify other suitable types of network conditions between the server 106' or 106" and the client device 102. The inference module 154 can further be configured to generate or update records of network data 113 in the network storage 118.

Figure 2D:
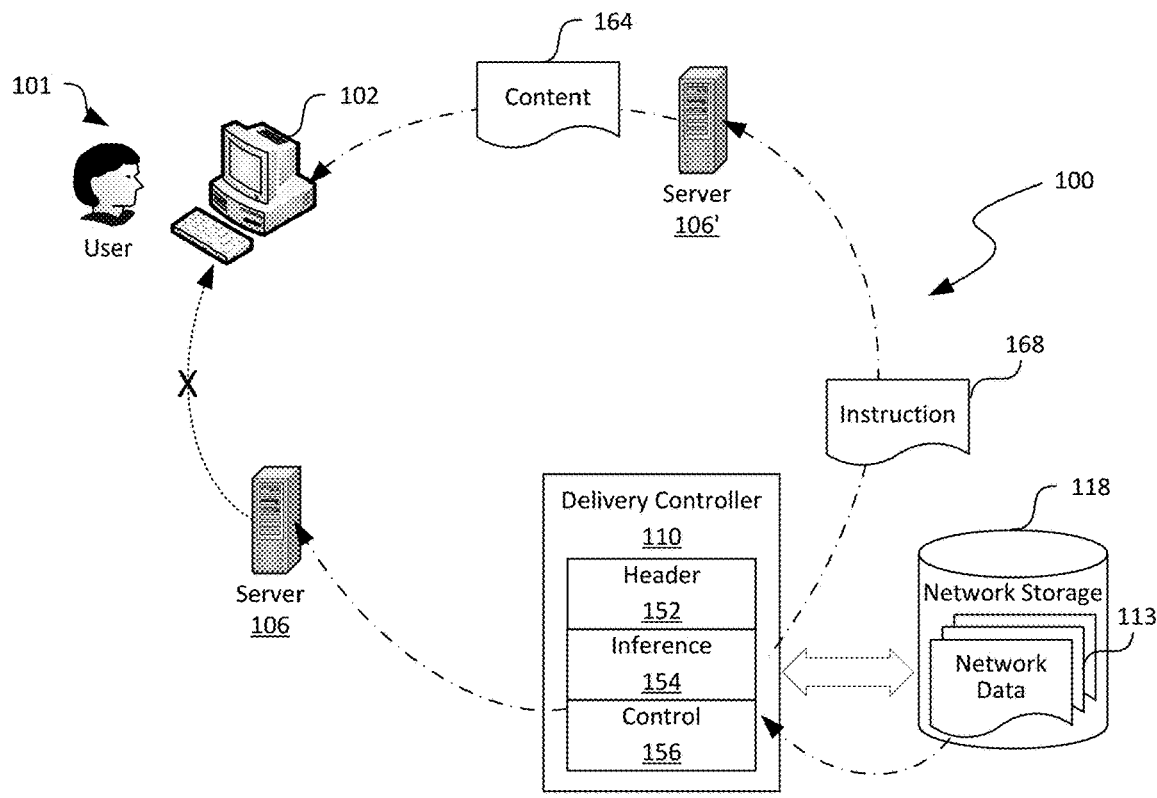

Using the network data 113, the control module 156 can be configured to effectively manage content or cloud service delivery from the individual servers 106. For instance, as shown in FIG. 2D, upon detecting that a connection between the server 106 and the client device 102 is lost or slow, the control module 156 can be configured to retrieve the network data 113 to identify network conditions between the client device 102 and the other servers 106 in the computing network 100. In the illustrated example, the control module 156 can identify that a network condition between the another server 106' is better than that between the server 106" and the client device 102, or there is no network connectivity between the server 106" and the client device 102. As a result, the control module 156 can be configured to transmit an instruction 168 to the server 106' instructing the server 106" to continue providing the content 164 to the client device 102. Thus, when a network condition between the server 106 and the client device 102 is detected, the control module 156 can switch content delivery from the server 106 to the server 106' to achieve low latency and high availability.

In certain implementations, the delivery controller 110 can also be configured to identify an association of the client device 102 with a local DNS server (shown as LDNS 109 in FIG. 3A) by forcing the LDNS to recursively resolve a domain name for a network address to submit status reports. For example, as shown in FIG. 3A, the header module 152 of the delivery controller 110 can be configured to generate and/or assign a new domain name for the server 106' (FIG. 2C), such as "https://neltest2.com/report." The header module 152 can also be configured to create a new resource record 117 in an authoritative DNS server 109' to identify that the new domain name corresponds to an IP address of the server 106'.

Figure 3A:
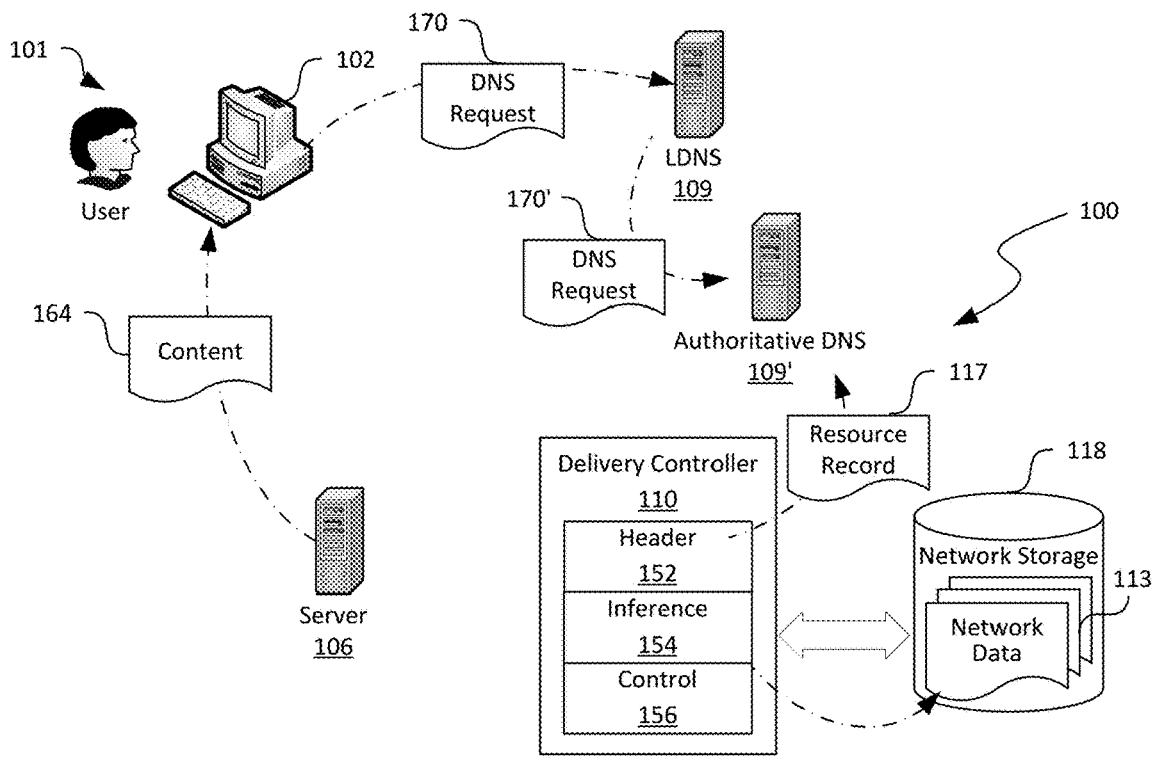
FIGS. 3A and 3B are schematic block diagrams illustrating additional operations of client-side measurement of computer network conditions in the distributed computing system of FIG. 1 in accordance with embodiments of the present technology.
Figure 3B:
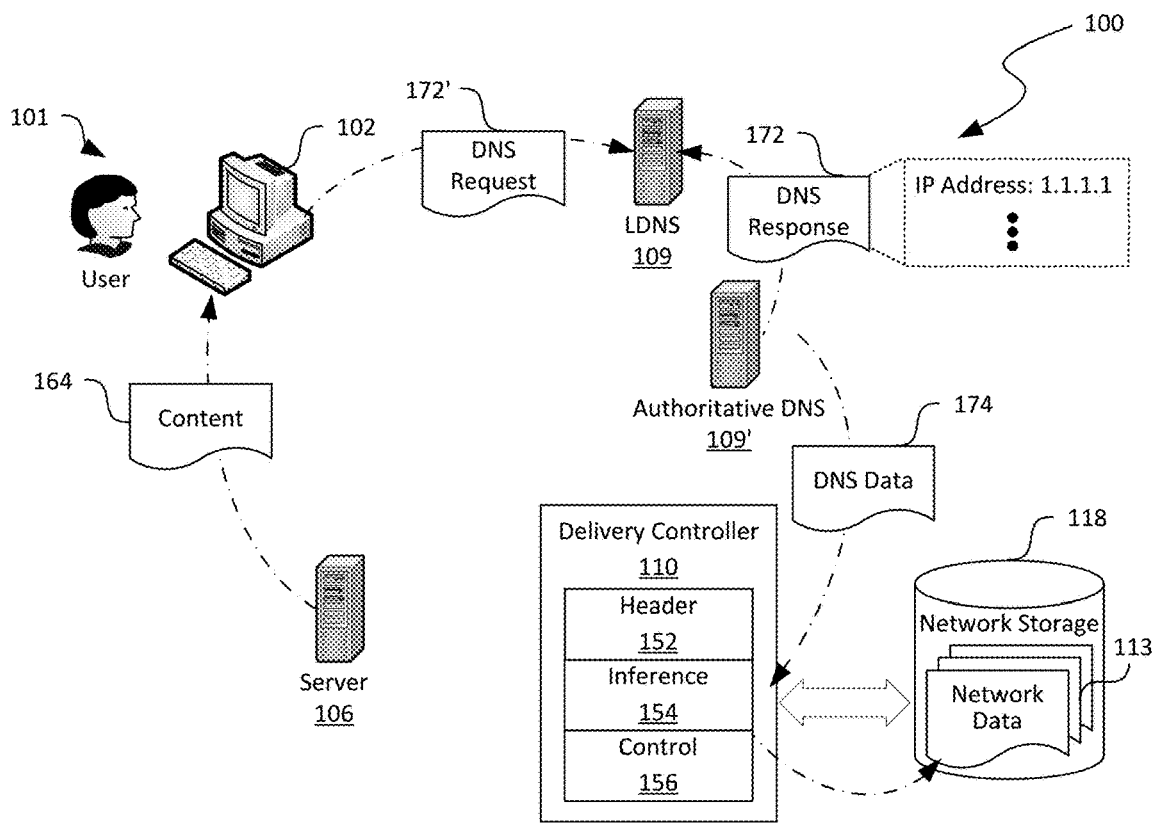

As shown in FIG. 3A, when the web browser 140 (FIG. 2A) on the client device 102 attempts to transmit status report 166 to the new domain name, the web browser 140 transmits a DNS request 170 to the LDNS 109 for domain name resolution. However, the LDNS 109 is unlikely to have a cached IP address that corresponds to this new domain name because the domain name is newly created. As such, the LDNS 109 attempts to resolve this domain name by consulting the authoritative DNS server 109' with another DNS request 170'. In response, the authoritative DNS server 109' can provide a DNS response 172 to the LDNS 109 with an IP address of the server 106', for instance, "1.1.1.1" as shown in FIG. 3B.

Upon identifying the LDNS 109 that requested the resolution of the new domain name, the authoritative DNS server 109' can also transmit a report of DNS data 174 regarding the DNS request 170 to the inference module 154 of the delivery controller 110. In turn, the inference module 154 can be configured to associate the client device 102 with the LDNS 109 and generate a mapping between the client device 102 and the LDNS 109.

Using such a mapping, the control module 156 of the delivery controller 110 can be configured to effectively manage content or cloud service delivery using various servers in the computing system 100. For example, when the mapping indicates that a number of client devices 102 associated with the LDNS 109 exceeds a threshold, the control module 156 can be configured to assign additional servers 106 to server content or cloud service requests from the client devise 102 by, for example, modifying IP addresses for a domain name corresponding to content delivery. On the other hand, when the mapping indicates that a number of client devices associated with the LDNS 109 is below another threshold, the control module 156 can be configured to assign a server 106 to serve the content or cloud service request even though the server 106 is already serving other client devices associated with other LDNSes.

Figure 4A:
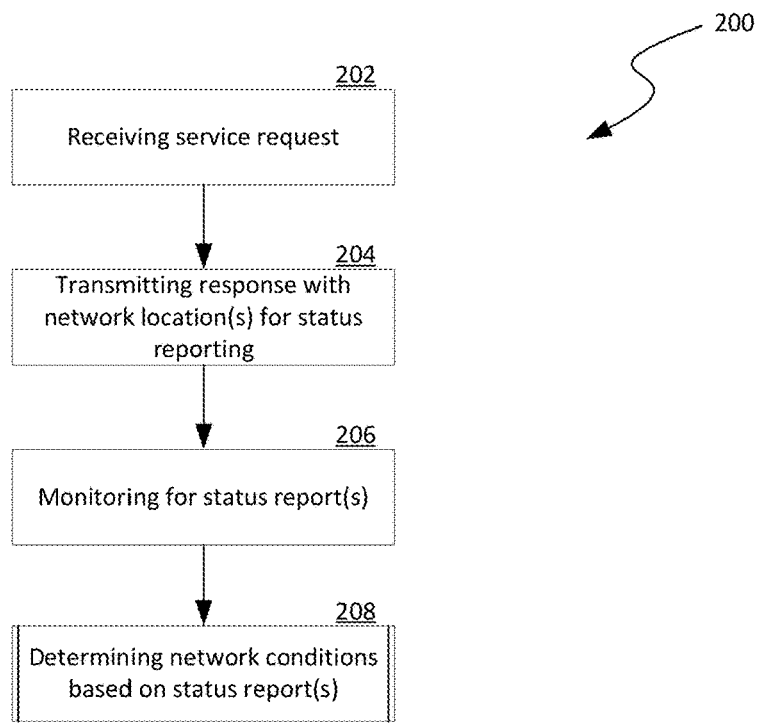
FIGS. 4A and 4B are flow diagrams illustrating aspects of client-side measurement of computer network conditions in accordance with embodiments of the present technology.
Figure 4B:
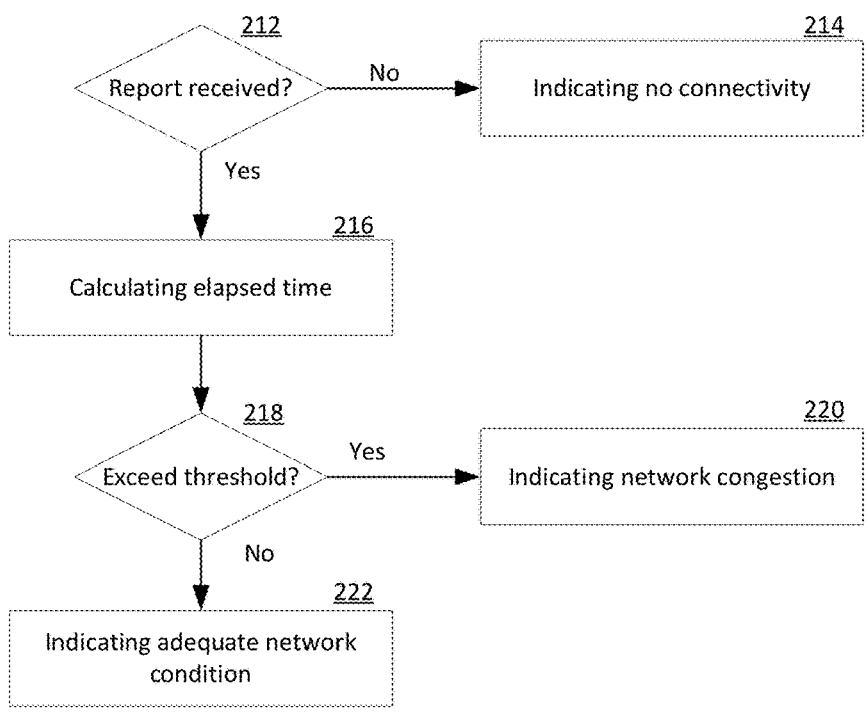

FIGS. 4A and 4B are flow diagrams illustrating aspects of processes for implementing client-side measurement of computer network conditions in accordance with embodiments of the present technology. Though the processes are described below in the context of the computing system 100 shown in FIGS. 1-3B, embodiments of the processes may also be implemented in other computing systems with additional and/or different components.

As shown in FIG. 4A, a process 200 can include receiving a service request from a client device at stage 202. In one embodiment, the service request can include a content request to a CDN. In another embodiments, the service request can include a request for initiating a virtual machine, a container, or other suitable types of cloud service. The process 200 can then include transmitting a response to the client device at stage 204. The response can include one or more network locations for status reporting. For example, the response can include a NEL header field and a Report-To header field that identify a network location, a frequency, a reporting threshold, or other suitable parameters of status reporting. The process 200 can then include monitoring for status reporting at stage 206. In one embodiment, the client device is directed to submit status reports to a server different than one that is currently providing cloud service to the client device. As such, monitoring for status reporting can include monitoring for status report at the server that is different than one that is currently providing cloud service to the client device. In other embodiments, the client device can be directed to submit status reports to multiple servers in a sequential, round-the-robin, or other suitable manners. The process 200 can then include determining a network condition between the server and the client device based on the monitoring for the status reports at stage 208. Examples of determining such network conditions are described in more detail above with reference to FIGS. 2A-2D as well as to FIG. 4B below.

FIG. 4B illustrates example operations for determining network conditions between a server and a client device based on status reports. As shown in FIG. 4B, the operations can include a decision stage 212 to determine whether any status report is received at the server fora threshold period. In response to determining that no status report has been received after the threshold period, the operations proceed to indicating that there is no connectivity between the server and the client device. Otherwise, the operations proceed to calculating an elapsed time between transmitting a response to the client device and receiving a status report from the client device at the server at stage 216. The operations can then include another decision stage 218 to determine whether the elapsed time exceeds a threshold. In response to determining that the elapsed time exceeds the threshold, the operations can proceed to indicating that a network congestion exists between the server and the client device. Otherwise, the operations proceed to indicating that the network condition between the server and the client device is adequate at stage 222.

Figure 5:
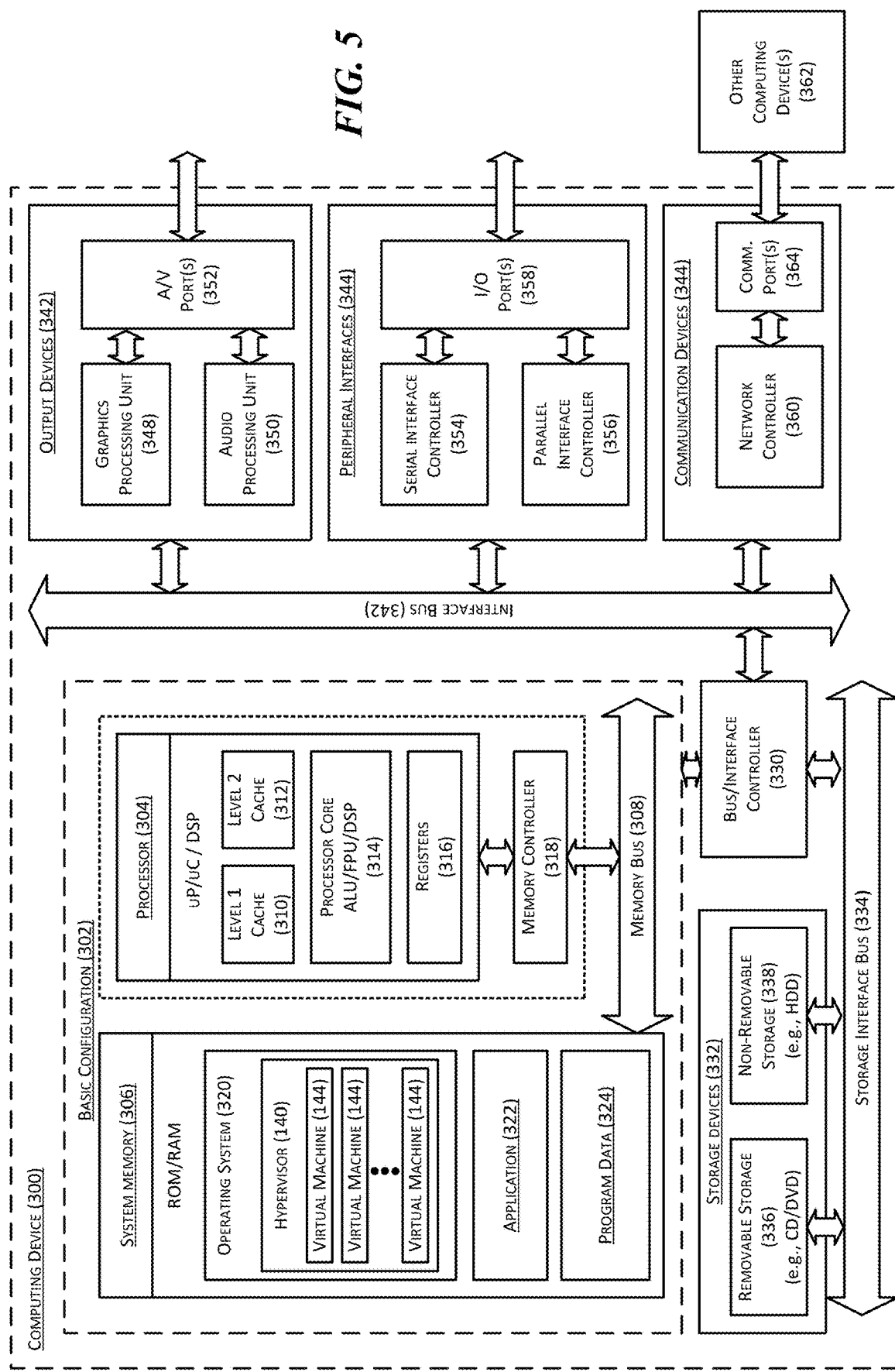
FIG. 5 is a computing device suitable for certain components of the computing system in FIG. 1.

FIG. 5 is a computing device 300 suitable for certain components of the computing system 100 in FIG. 1, for example, the server 106, the client device 102, or the delivery controller 110. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 8, the operating system 320 can include a hypervisor 140 140 for managing one or more virtual machines 144. This described basic configuration 302 is illustrated in FIG. 5 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method of measuring network conditions in a computer network interconnecting a computer system with a client device, the computer system having multiple servers, the method comprising:
   receiving, at a first server of the computer system via the computer network, a request for content from a web browser executed on the client device;
   in response to receiving the request for content:
      generating a new URL corresponding to a second server different than the first server in the computer system, the new URL indicating where the web browser is to transmit a status report;
      transmitting, from the first server to the web browser on the client device, a response to the request for content, the response having a header field containing the new URL; and
   subsequent to transmitting the response to the request for content,
      receiving, at the second server of the computer system from the client device via the computer network, multiple packets containing data representing a connection request initiated by a background process of the web browser according to the new URL contained in the header field of the response to establish a network session for transmitting the status report from the web browser on the client device to the second server;
      in response to receiving the multiple packets containing data representing the connection request, at the second server, determining a condition of the computer network between the second server and the client device based on transmission/reception measurements of the received multiple packets at the second server;
   selectively directing the first or second server of the computer system to provide the content requested by the web browser based on the determined condition of the computer network; and
   in response to receiving a notification indicating that a resolution request for resolving the new URL has been received from a domain name server, updating a record associating the domain name server with the client device.

2. The method of claim 1 wherein:
   transmitting the response includes transmitting the response along with at least a portion of the content requested by the web browser; and
   selecting directing the first or second server includes switching delivery of the content requested by the web browser from the first server to the second server based on the determined condition of the computer network.

3. The method of claim 1 wherein:
   transmitting the response includes transmitting the response along with at least a portion of the content requested by the web browser; and
   selecting directing the first or second server includes continuing delivery of the content requested by the web browser from the first server instead of the second server based on the determined condition of the computer network.

4. The method of claim 1, further comprising:
   subsequent to transmitting the response to the request for content,
   determining whether any packets containing data representing the status report are received, at the second server, from the web browser on the client device for a preset amount of time; and
   in response to determining that no packets containing data representing the status report are received from the web browser on the client device for the preset amount of time, indicating that the condition of the computer network between the second server and the client device is no connectivity.

5. The method of claim 1, further comprising:
   upon receiving the data representing the status report,
   calculating an elapsed time between a timestamp of transmission and a time of reception at the second server of one of the multiple packets;
   determining whether the elapsed time exceeds a preset threshold; and
   in response to determining that the elapsed time exceeds the preset threshold, indicating that the condition of the computer network between the second server and the client device is network congestion.

6. The method of claim 1 wherein determining the condition of the computer network between the second server and the client device includes determining, based on a timestamp of transmission of the multiple packets, one of:
   determining a round trip time between the client device and the second server;
   a time to first byte;
   a throughput;
   a loss of packets or retransmission; or
   a jitter of the multiple packets represented by packet inter-arrival time.

7. The method of claim 1, further comprising:
receiving, at a domain name server of the computer system, a resolution request for resolving the new URL from another domain name server; and
in response to receiving the resolution request,
providing an IP address of the second server to the another domain name server; and
generating or updating a record in a database associating the another domain name server with the client device.

8. The method of claim 1 wherein:
the new URL identifies a third server different than the first or second server in the computer system; and
the method further includes:
receiving, at the third server of the computer system, multiple packets containing data representing another status report from the web browser on the client device;
upon receiving the data representing the another status report, determining another condition of the computer network between the third server and the client device based on transmission/reception measurements of the received multiple packets at the third server; and
selectively directing the first, second, or third server of the computer system to provide the content requested by the web server based on the determined condition of the computer network between the second server and the client device and the another condition of the computer network between the third server and the client device.

9. A computing device in a computer system having multiple servers, the computing device being interconnected to a client device via a computer network, wherein the computing device comprising:
a processor; and
a memory operatively coupled to the processor, the memory includes instructions executable by the processor to cause the computing device to:
receive a notification indicating that a request for a computing service is received from a web browser executed on the client device; and
in response to receiving the notification:
generate a new URL corresponding to a server, the new URL indicating a server in the computer system to which the web browser is to transmit a status report;
insert the new URL into a header field of a response to be transmitted to the client device; and
subsequently,
identify multiple packets containing data representing the status report from the web browser on the client device received at the server corresponding to the new URL, the status report being initiated by a background process of the web browser on the client device according to the inserted new URL contained in the header field of the response;
determine a condition of the computer network between the server and the client device based on transmission/reception measurements of the multiple packets at the server;
selectively directing the servers of the computer system to provide content requested by the web browser based on the determined condition of the computer network; and
in response to receiving a notification indicating that a resolution request for resolving the new URL has been received from a domain name server, updating a record associating the domain name server with the client device.

10. The computing device of claim 9 wherein to determine the condition of the computer network includes to:

determine whether any packets containing data representing the status report are received, at the server, from the web browser on the client device for a preset amount of time; and
in response to determining that no packets containing data representing the status report are received from the web browser on the client device for the preset amount of time, indicate that the condition of the computer network between the server and the client device is no connectivity.

11. The computing device of claim 9 wherein to determine the condition of the computer network includes to:
calculate an elapsed time between a timestamp of transmission and a time of reception at the server of one of the multiple packets;
determine whether the elapsed time exceeds a preset threshold; and
in response to determining that the elapsed time exceeds the preset threshold, indicate that the condition of the computer network between the server and the client device is network congestion.

12. The computing device of claim 9 wherein:
the memory includes additional instructions execution of which cause the computing device to:
receive a second notification indicating that a resolution request for resolving the new URL is received at a domain name server of the computer system from another domain name server; and
in response to receiving the second notification, generate or update a record in a database associating the another domain name server with the client device.

13. The computing device of claim 9 wherein:
the new URL identifies another server different than the server in the computer system; and
the memory includes additional instructions execution of which cause the computing device to:
identify multiple packets containing data representing the status report from the web browser on the client device received at the another server corresponding to the new URL;
determine a condition of the computer network between the another server and the client device based on transmission/reception measurements of the multiple packets at the another server; and
selectively directing the servers of the computer system to provide the content requested by the web browser based on the determined condition of the computer network between the server and the client device and the another condition of the computer network between the another server and the client device.

14. A method of measuring network conditions in a computer system having a client device interconnected to a computer system having multiple servers via a computer network, the method comprising:
in response to receiving a notification indicating that a request for a computing service has been received from a web browser executed on the client device,
instructing a first server to provide the computing service indicated in the received request;
generating a new URL corresponding to a second server in the computer system to which the web browser is to transmit a status report;

inserting the new URL into a header field of a response to be transmitted to the client device in response to the received request; and subsequently, identifying multiple packets containing data representing the status report from the web browser received at the second server corresponding to the new URL, the status report being initiated by a background process of the web browser on the computing device according to the inserted new URL contained in the header field of the response;

determining a condition of the computer network between the second server and the client device based on transmission/reception measurements of the multiple packets at the second server;

selectively directing the first or second server of the computer system to provide the computing service requested by the web browser based on the determined condition of the computer network; and in response to receiving a notification indicating that a resolution request for resolving the new URL has been received from a domain name server, updating a record associating the domain name server with the client device.

15. The method of claim 14, further comprising:

subsequent to the response is transmitted to the request for content, determining whether any packets containing data representing the status report are received, at the second server, from the web browser on the client device for a preset amount of time; and in response to determining that no packets containing data representing the status report are received from the web browser on the client device for the preset amount of time, indicating that the condition of the computer network between the second server and the client device is no connectivity.

16. The method of claim 14, further comprising:

upon receiving the data representing the status report, calculating an elapsed time between a timestamp of transmission and a time of reception at the second server of one of the multiple packets;

determining whether the elapsed time exceeds a preset threshold; and in response to determining that the elapsed time exceeds the preset threshold, indicating that the condition of the computer network between the second server and the client device is network congestion.

17. The method of claim 14 wherein:

the method further includes:

receiving, at a domain name server of the computer system, a resolution request for resolving the new URL from another domain name server; and in response to receiving the resolution request, providing an IP address of the second server to the another domain name server; and generating or updating a record in a database associating the another domain name server with the client device.

* * * * *